(No Model.)
D. H. JACKMAN.
TIRE GAGE.
No. 451,053. Patented Apr. 28, 1891.
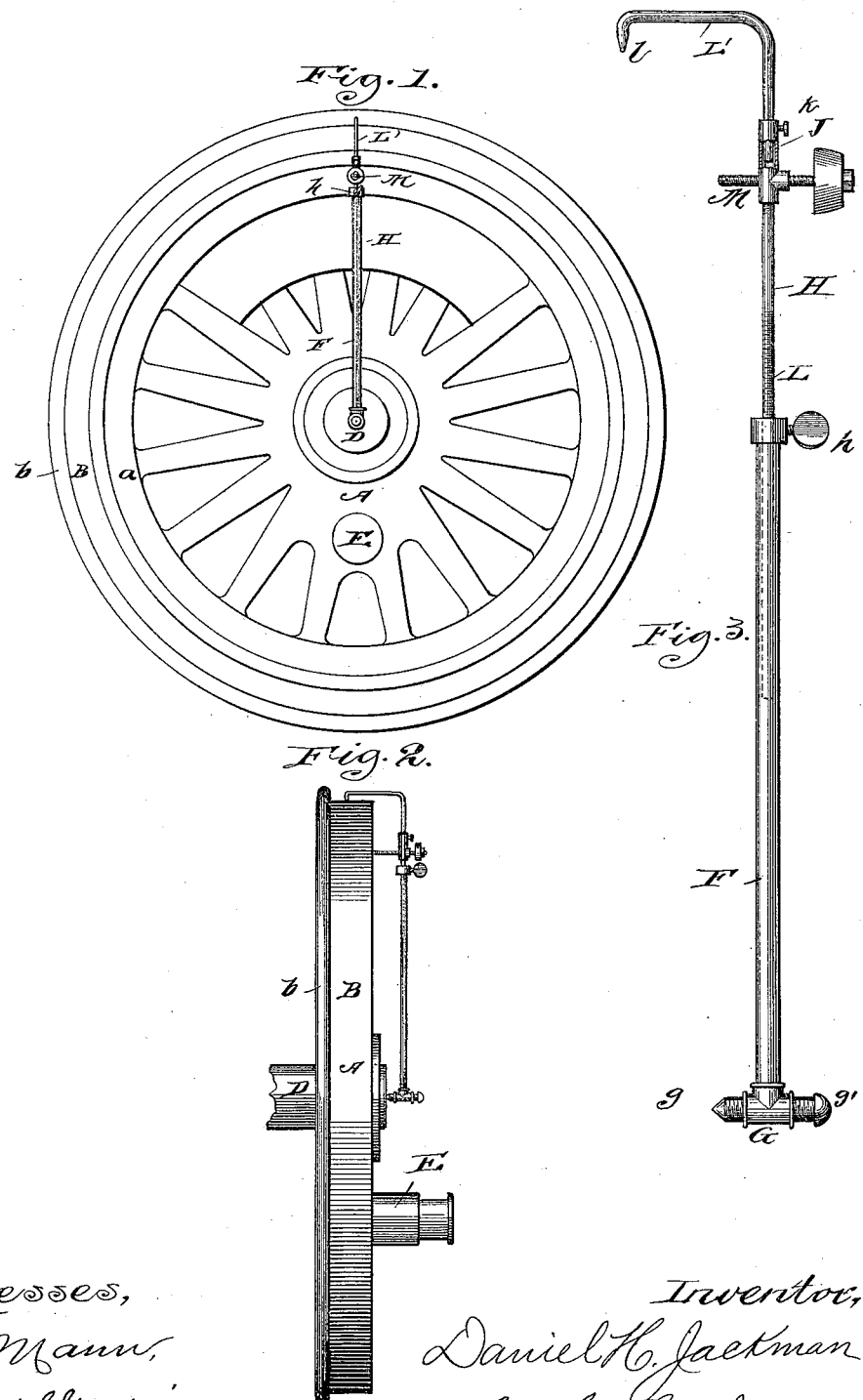
Witnesses,
J. T. Mann,
Frederick F. Goodwin
Inventor,
Daniel H. Jackman
By C. C. Linthicum
Atty.

UNITED STATES PATENT OFFICE.

DANIEL H. JACKMAN, OF CHICAGO, ILLINOIS.

TIRE-GAGE.

SPECIFICATION forming part of Letters Patent No. 451,053, dated April 28, 1891.

Application filed October 20, 1890. Serial No. 368,645. (No model.)

*To all whom it may concern:*

Be it known that I, DANIEL H. JACKMAN, of Chicago, Illinois, have invented certain new and useful Improvements in Tire-Gages, of which the following is a specification.

My invention has for its object to provide a simple means for determining the locality and amount of wear on the tires of wheels; and my invention is particularly useful in determining the extent of flatness or wear upon the tires of the driving-wheels of locomotive-engines, and can be readily and conveniently used for this purpose without taking off the wheel or disconnecting any of the parts.

In the use of locomotive-engines the tires usually wear at a point near the flange and over only a portion of the face of the tire, the width of the worn portion being approximately that of the face of the rail and of similar configuration in cross-section. The flattening of the tire is due, mainly, to the presence of soft spots in the tire or to an improper adjustment of the counter-balance. This wearing usually commences as soon as the engine is put in service, but does not become perceptible to the eye until it has progressed to such an extent as to make the use of the engine undesirable, if not dangerous.

My invention provides a simple instrument by which the location and extent of the wear can be readily ascertained and a record thereof made, and when the wearing has progressed so as to unfit the engine for service the driving-wheels are taken off and the tires turned true again.

In carrying out my invention I employ a stock having a longitudinal aperture therein to receive a sliding rod, the upper end of which rod is hooked or bent and terminates in a point which is adapted to be brought to bear on the surface of the tire, the lower end of the stock being provided with a centering-pin, which is adapted to rest in the usual center or depression in the end of the driving-axle, and then by swinging the hooked end of the rod with its point in contact with the surface of the tire any inequalities therein may be readily discovered. The sliding rod is marked with a scale, if desired, so that by the longitudinal movement of the rod the depth of the wear may be determined. Provision is also made for holding the rod to a straight path on the surface of the wheel and for adjusting it to wheels having tires of different thicknesses.

In the accompanying drawings, Figure 1 is a side elevation of a locomotive driving-wheel and rear elevation of my improved gage. Fig. 2 is an edge view of the wheel and side view of the gage; and Fig. 3 is a side elevation, partly in section, of the gage.

In the drawings, A indicates a locomotive driving-wheel; *a*, the rim thereof; B, the tire, and *b* the flange thereof.

D represents the axle, and E the crank-pin. The end of the axle usually has a countersink, either pointed or rounded, and this center is always observed in determining the amount of wear on the surface of the tire.

My improved gage is best shown in Fig. 3. F indicates a stock, which may be a tube having an aperture either cylindrical or square in cross-section. At the lower end of this stock is applied a centering-pin G, having preferably a pointed end *g* and a rounded end *g'* to adapt it to enter either of the two usual forms of countersinks in the axle. H is a sliding rod, the longitudinal movement whereof may be controlled by the set-screw *h*, and which is provided, preferably, with a scale L. Said rod will, for convenience, be divided into two parts, the upper member thereof being adapted to slide in a sleeve J, carried by the lower member, and the movement of the upper member being controlled by the set-screw *k*. Said upper member has the bent portion L and the downwardly-hung point *l*, which is intended to contact with the surface of the tire. An adjusting-screw M affords means for maintaining the rod parallel to the vertical side of the wheel.

In using the gage the centering-pin is placed in the countersink in the axle and the hooked end of the sliding rod so placed that the point *l* is in contact with the surface of the tire. The gage will be set to indicate the known diameter of the wheel when in the normal condition, and as the point of the gage is moved around the tire the user can, by observation or by the scratching sound of the point, determine when the point has reached a flat place in the tire, at which point he will mark the tire and by the continued movement of the gage will ascertain the length of the flatness, and, if desired, may take the depth thereof by moving the sliding rod into the stock and observing the scale. A record is made of this, and when the flatness has reached a certain state the wheel must be taken off and the tire turned true again.

If desired, an indicator mechanism of any well-known form may be secured with the moving part of my improved gage; but for ordinary uses the instrument in the form shown in the drawings is sufficient. The depth of the flatness may also be ascertained by raising the centering-pin out of the countersink in the axle and letting the point of the pin project beyond the center of the axle until the point $l$ touches the surface of the tire. A scratch may then be made on the end of the axle and the distance of this scratch from the center of the axle indicates the amount of flatness.

The indicator mechanism might be applied to the stock instead of to the sliding rod.

I do not of course limit my invention to precise details of construction, as the form and relative arrangement of parts may be modified without departing from the spirit of my invention.

I claim—

1. A tire-gage comprising, in combination, a stock bearing at one end thereof a centering-pin, a rod having a sliding connection with the stock, and means for locking it therewith, said rod having an overhanging point adapted to traverse the tire, substantially as described.

2. A tire-gage comprising, in combination, a stock having a centering-pin, a sliding rod having a hooked end with a point adapted to traverse the surface of the tire, and an adjusting-screw adapted to impinge on the side of the tire or rim of the wheel, whereby to maintain the stock and rod in a position parallel to the side of the wheel, substantially as described.

3. A tire-gage comprising, in combination, a stock having a centering-pin, and a sliding rod having a hooked end adapted to traverse the surface of the tire, said rod consisting of two members adapted to telescope with each other, whereby to adjust the gage for use with varying thicknesses of tire, substantially as described.

DANIEL H. JACKMAN.

Witnesses:
C. C. LINTHICUM,
FREDERICK C. GOODWIN.